(12) United States Patent
Bridge, Jr. et al.

(10) Patent No.: US 9,141,508 B2
(45) Date of Patent: Sep. 22, 2015

(54) ASSIGNING READ REQUESTS BASED ON BUSYNESS OF DEVICES

(75) Inventors: Willliam H. Bridge, Jr., Alameda, CA (US); Prasad Bagal, San Jose, CA (US); Lavina Jain, Sunnyvale, CA (US); Rajiv Wickremesinghe, Belmont, CA (US); Darshan Nagarajappa, San Francisco, CA (US); Richard L. Long, Woodside, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1008 days.

(21) Appl. No.: 12/975,242

(22) Filed: Dec. 21, 2010

(65) Prior Publication Data

US 2012/0159094 A1    Jun. 21, 2012

(51) Int. Cl.
G06F 12/00    (2006.01)
G06F 11/20    (2006.01)
G06F 11/34    (2006.01)

(52) U.S. Cl.
CPC ........ G06F 11/3433 (2013.01); G06F 11/2094 (2013.01)

(58) Field of Classification Search
CPC ............ G06F 11/3419; G06F 11/3433; G06F 11/2094; G06F 9/5088
See application file for complete search history.

(56) References Cited

U.S. PATENT DOCUMENTS

| | | | |
|---|---|---|---|
| 6,112,257 A * | 8/2000 | Mason et al. | 711/114 |
| 6,233,607 B1 * | 5/2001 | Taylor et al. | 711/114 |
| 6,904,599 B1 | 6/2005 | Cabrera et al. | |
| 7,143,259 B2 | 11/2006 | Dalal et al. | |
| 7,334,092 B1 * | 2/2008 | Wang et al. | 711/158 |
| 7,552,280 B1 | 6/2009 | Naamad et al. | |
| 7,673,173 B2 | 3/2010 | Chen et al. | |
| 7,685,388 B1 | 3/2010 | Jiang | |
| 7,689,611 B2 * | 3/2010 | Watanabe et al. | 707/691 |

(Continued)

OTHER PUBLICATIONS

Reliability and Performance of Mirrored Disk Organizations http://portal.acm.org/citation.cfm?id=1459675.1459677&coll=Portal&dl=GUIDE&CFID=98401165&CFTOKEN=84864795# (2008) 2 pages.

(Continued)

*Primary Examiner* — Michael Krofcheck
(74) *Attorney, Agent, or Firm* — Hickman Palermo Becker Bingham LLP

(57) ABSTRACT

Techniques are provided for assigning read requests to storage devices in a manner that reduces the likelihood that any storage device will become overloaded or underutilized. Specifically, a read-request handler assigns read requests that are directed to each particular item among the storage devices that have copies of the item based on how busy each of those storage devices is. Consequently, even though certain storage devices may have copies of the same item, there may be times during which one storage device is assigned a disproportionate number of the reads of the item because the other storage device is busy with read requests for other items, and there may be other times during which other storage device is assigned a disproportionate number of the reads of the item because the one storage device is busy with read request for other items. Various techniques for estimating the busyness of storage devices are provided, including fraction-based estimates, interval-based estimates, and the response-time-based estimates. Techniques for smoothing those estimates, and for handicapping devices, are also provided.

20 Claims, 2 Drawing Sheets

(56) References Cited

U.S. PATENT DOCUMENTS

| | | |
|---|---|---|
| 8,024,542 B1* | 9/2011 | Chatterjee et al. ............ 711/170 |
| 8,078,901 B1* | 12/2011 | Meyer et al. .................. 713/501 |
| 2005/0283552 A1 | 12/2005 | Kobashi et al. |
| 2007/0067670 A1 | 3/2007 | Ebsen et al. |
| 2007/0153102 A1* | 7/2007 | Suzuki et al. ............ 348/240.99 |
| 2007/0208520 A1* | 9/2007 | Zhang et al. .................... 702/58 |
| 2007/0245081 A1 | 10/2007 | Ogawa |
| 2008/0215810 A1* | 9/2008 | Yamada et al. ............... 711/114 |
| 2009/0024814 A1 | 1/2009 | Eisler et al. |
| 2010/0082900 A1* | 4/2010 | Murayama et al. ........... 711/114 |
| 2011/0320729 A1* | 12/2011 | Bronson et al. ............... 711/130 |

OTHER PUBLICATIONS

Restoring Protection Without a Hot Spare Disk http://www.ardentperf.com/2010/07/15/asm-mirroring-no-hot-spare-disk/ (2010) 3 pages.

Practical Guide to Mirrored Disk/iX http://docs.hp.com/en/14981/Practical_guide_Mirrored_disk.pdf.(1996) 31 pages.

Oracle® Database Storage Administrator's Guide 11g Release 1 (11.1) http://download.oracle.com/docs/cd/B28359_01/server.111/b31107.pdf (2008) 154 pages.

Veritas Volume Manager 5.0 Administrator's Guide http://www.docs.hp.com/en/5991-5512/5991-5512.pdf (2006) 512 pages.

* cited by examiner

US 9,141,508 B2

ASSIGNING READ REQUESTS BASED ON BUSYNESS OF DEVICES

FIELD OF THE INVENTION

The present invention relates to load balancing and, more specifically, to assigning read requests to devices based on busyness measures.

BACKGROUND

Storage devices are used to store various types of digital items, such as documents, images, database objects, data extents, data files, audio files, video files, etc. To ensure that valuable items are not permanently lost, it is common for items to be mirrored across multiple storage devices. For example, assume that a system includes five storage devices that are used to store five items. Rather than store each of the five items on a single one of the five disks, copies of each of the items may be stored on two different disks within the system. Because, for each item, copies are stored on two different disks, the failure of any one disk will not cause any item to be lost.

Storage devices, no matter how large and fast, have finite I/O processing capabilities. If too many read requests are issued to any particular storage device, the performance of the system suffers. Consequently, techniques have been developed to balance the load of read requests that target any particular item among the storage devices that store copies of the item. For example, if disks A and B store copies of an item X, then half of the read requests that target item X may be issued to disk A, and the other half of the read requests that target item X may be issued to disk B. To accomplish this distribution, the storage system may simply alternate read requests for item X between the two disks, or divide item X into two logical volumes, where read requests that map to one of the volumes are issued to disk A, and read requests that map to the other volume are issued to disk B.

Systems that evenly balance read requests that target a particular item between the storage devices that have copies of the item work well as long as the items are evenly spread among the storage devices in the system, each item receives approximately the same number of read requests, and no device fails. However, various circumstances may lead to situations in which items are not spread evenly and/or different items receive vastly different numbers of I/O requests.

For example, it is not uncommon for some items to become "hot spots" to which read requests are issued at a much higher frequency than other items. Depending on the nature of the data that is stored on the storage devices, such hot spots may correspond, for example, to an important just-released news story, a popular song, or hot stock prices stored in a database. Regardless of the cause of hot spots, unless the hot spots are distributed evenly among the storage devices, some storage devices may become overloaded while others are underutilized.

One way of mitigating the detrimental effect of hot spots is to move copies of items that have hot spots to storage devices that are otherwise underutilized. This may work well if hotspots were constant and predictable, but items that may be highly accessed at one point of time may be rarely accessed at other times. Consequently, moving copies of items among storage devices to mitigate hot spots may cause more performance problems than are caused by the hot spots themselves.

Situations that skew the distribution of items among a set of storage devices are also common. For example, assume that two copies each of five items are distributed evenly among five storage devices, as shown in system 100 of FIG. 1. If the five items (A-E) are accessed at the same rate, and the read requests for each item are divided equally among the copies of the item, then the workload on each storage device (102-110) will be approximately the same. However, if one of those devices fails, all of the I/O requests that would have been handled by that failed device will have to be handled by the two devices that have copies of the items that were on the failed device. This causes those two devices to be overloaded, while the other two storage devices continue to receive the same number of read requests they received prior to the failure.

Specifically, assume that storage device 102 fails. After the failure, all of the read requests for item A will be sent to storage device 104, and all of the read requests for item E will be sent to storage device 110. The I/O load of storage devices 106 and 108 would not be affected. Assuming that all five items are being accessed at the same rate (e.g. 100 reads per second), the I/O load for each of storage devices 104 and 110 will be 50% higher (150 reads per second) than the I/O load for each of storage devices 106 and 108 (100 reads per second).

One way to reduce the workload skew that results when a storage device fails is to ensure that the items on any given storage device are mirrored, randomly or otherwise, across a large number of other storage devices. Consequently, when the storage device fails, the extra read load that will be incurred by other devices when the device fails will not be too significant for any one storage device. However, the overhead incurred by creating and managing relatively fine-granularity items that are mirrored across large numbers of storage devices reduces any benefit achieved by the improved post-failure workload distribution. In addition, spreading the mirror copies randomly over a large number of storage devices makes the system (a set of devices) more prone to loss of availability of data in the event of multiple failures.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
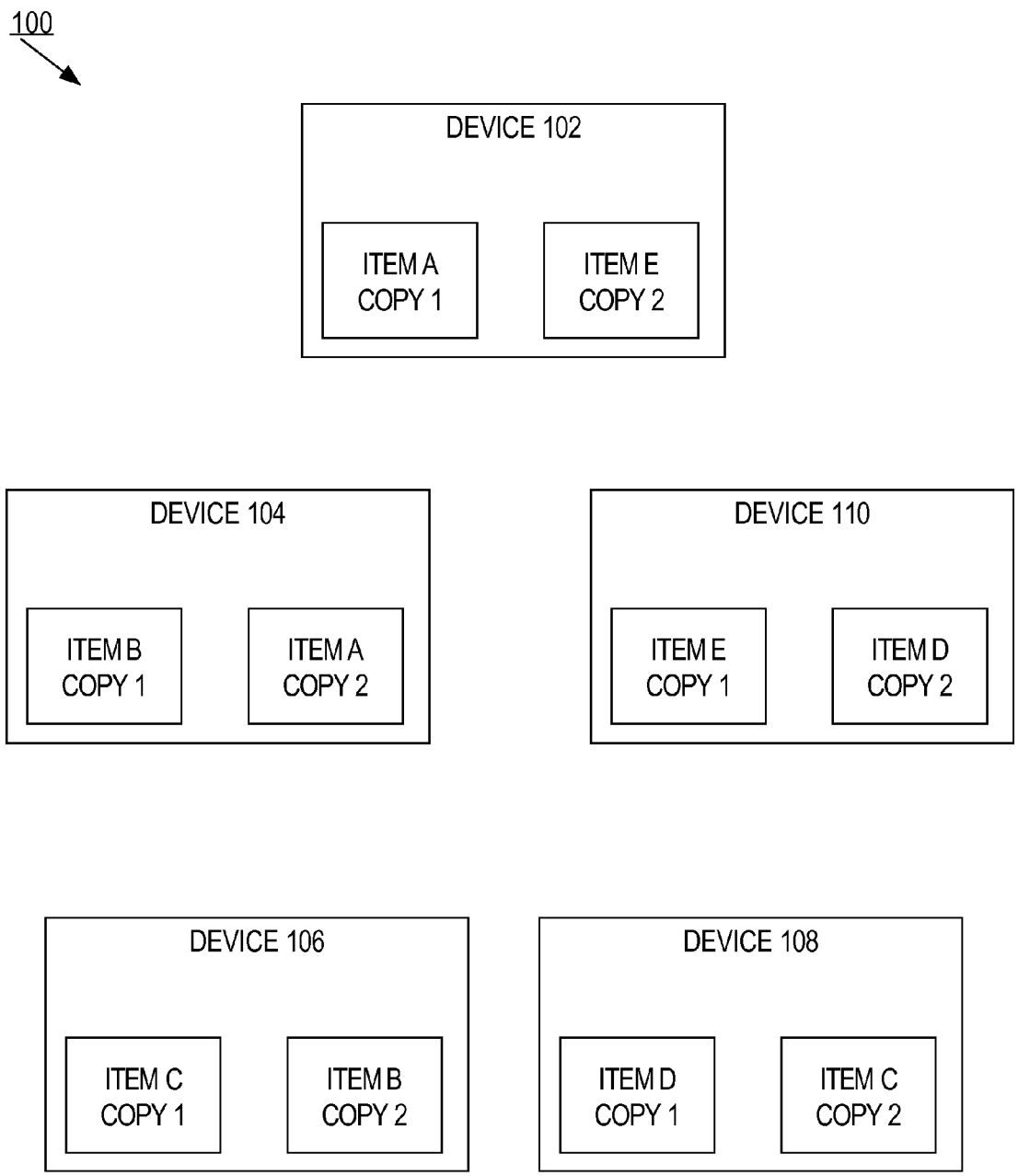
FIG. 1 is a block diagram of a system in which five storage devices store five items, each of which has a copy on two of the five storage devices.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for assigning read requests to storage devices in a manner that reduces the likelihood that any storage device will become overloaded or underutilized. In particular, techniques are provided in which a read-request handler assigns read requests that are directed to each particular item among the storage devices that have copies of the item based on how busy each of those storage devices is. Consequently, even though storage devices 102 and 104 may have copies of the same item A, there may be times during which storage device 102 is assigned a disproportionate number of the reads of item A because storage device 104 is busy with read requests for other items, and there may be other times during which storage device 104 is assigned a disproportionate number of the reads of item A because storage device 102 is busy with read request for other items.

The busyness of a storage device may be estimated in various ways. Various techniques for estimating the busyness of storage devices shall be described hereafter, including fraction-based estimates, interval-based estimates, and the response-time-based estimates. However, the techniques described herein are not limited to any particular mechanism for estimating the busyness of a storage device.

Because read requests are assigned to storage devices based on the relative busyness of the devices that have the items that are targeted by the read requests, the failure of a storage device can have a cascading affect that increases the load both of devices that are mirroring items of the failed device ("partner devices"), and devices that are not mirroring items of the failed device ("non-partner devices"). For example, failure of device 102 will cause the read requests received by partner devices 104 and 110 to increase. The increase in read requests experienced by devices 104 and 110 will initially cause devices 104 and 110 to be busier than devices 106 and 108. Because device 104 is busier than device 106, read requests for item B will begin to be assigned disproportionately to device 106. Similarly, because device 110 is busier than device 108, read requests for item D will be assigned disproportionately to device 108. Eventually, system 100 will achieve a state of relative equilibrium in which all devices are equally busy, even though the partner devices for any given item are not handling an equal number of read requests for that item. For example, each of devices 102 to 110 may end up with 125 reads-per-second, as follows:

Device 104: 100 reads-per-second of item A, 25 reads-per-second of item B

Device 106: 75 reads-per-second of item B, 50 reads-per-second of item C

Device 108: 50 reads-per-second of item C, 75 reads-per-second of item D

Device 110: 25 reads-per-second of item D, 100 reads-per-second of item E

Fraction-Based Busyness Estimates

According to one embodiment, when a storage device fails, the mechanism responsible for directing read requests to storage devices (referred to herein as a read-request handler) determines the fraction by which the failure should increase the read request load of each remaining device. That new load is the "target increase". Once the target increase is determined, the read-request handler determines what fraction of the read requests each device should receive, for each item stored on the device, in order for the device to achieve the target increase. According to one embodiment, a percentage-revision operation is initiated starting with the partner devices of the failed device.

For example, assume that device 102 in system 100 fails. Because system 100 had five storage devices before the failure, and will have four storage devices after the failure, the target increase is 25%. That is, the number of read requests that each of the remaining devices handles after the failure of device 102 should increase by 25%.

In the present example, the partner devices of the failed device 102 are devices 104 and 110. Therefore, in one embodiment, the read-request handler begins percentage-revision operations at devices 104 and 110. In the percentage-revision operation started at device 104, the read-request handler determines that for device 104 the read request percentage for item A will increase from 50% to 100% because, with device 102 gone, device 104 has the only copy of item A. If the read-request handler makes no other changes to the percentages applicable to the items on device 104, the total read load on device 104 will increase by 50%.

A 50% increase in load is higher than the 25% target increase, so additional adjustments must be made. Specifically, to achieve the 25% target increase on device 104, the percentage of reads of other items stored on device 104 needs to be reduced. Specifically, to achieve the 25% target increase, the read-request handler has to reduce the percentage of read requests device 104 handles for item B by 50%. Thus, the read requests of item B handled by device 104 is reduced from 50% to 25%.

Reducing the percentage of read requests of item B handled by device 104 to 25% means that the percentage of read requests of item B handled by device 106 must increase to 75%. Increasing the read requests of item B handled by device 106 to 75% results in an overall increase for device 106 of 25%. Since 25% is the target increase, the read-request handler does not need to make any further adjustments to the percentage of reads for the other items stored on device 106. Specifically, 50% of the read requests for item C may continue to be sent to device 106.

In the percentage-revision operation started at device 110, the read-request handler determines that for device 110 the read request percentage for item E will increase from 50% to 100% because, with device 102 gone, device 110 has the only copy of item E. If the read-request handler makes no other changes to the percentages applicable to the items on device 110, the total read load on device 110 will increase by 50%.

A 50% increase in load is higher than the 25% target increase, so additional adjustments must be made. Specifically, to achieve the 25% target increase on device 110, the percentage of reads of other items stored on device 110 needs to be reduced. Specifically, to achieve the 25% target increase, the read-request handler has to reduce the percentage of read requests device 110 handles for item D by 50%. Thus, the read requests of item D handled by device 110 is reduced from 50% to 25%.

Reducing the percentage of read requests of item D handled by device 110 to 25% means that the percentage of read requests of item D handled by device 108 must increase to 75%. Increasing the read requests of item B handled by device 108 to 75% results in an overall increase for device 108 of 25%. Since 25% is the target increase, the read-request handler does not need to make any further adjustments to the percentage of reads for the other items stored on device 108. Specifically, 50% of the read requests for item C may continue to be sent to device 108.

As illustrated in the above-example, the percentage of read requests that each device will receive for each item the device is storing is propagated in a chain-like manner, starting with the partners of the failed node, to achieve the target increase across all devices. Once the percentages have been calculated, the read-request handler assigns read requests to the devices based on the percentages. Specifically, the read-request handler will send 100% of the read requests for item A to device 104, 25% of the read requests for item B to device 104, 75% of the read requests for item B to device 106, 50% of the read requests for item C to device 106, etc.

Estimating Busyness of Devices Using Intervals

To avoid the need to recalculate per-item-per-device percentages in response to changes in system 100 (which may involve a significant amount of overhead in large systems where each item is mirrored across several devices), the busyness of devices may be estimated by monitoring how frequently read requests are issued to each storage device. According to one embodiment, the degree of busyness that is produced by read requests is measured in terms of "intervals", where the interval of a given storage device is calculated when the read-request handler sends a read-request to the given storage device, and is based on the number of read requests received by the read-request handler since the previous read request that was sent to that given storage device.

For example, if the read-request handler sends a read request to device 102, then sends four read requests to other devices, and then sends another read request to device 102, the interval for device 102 is five. Note that interval is determined on a per-device basis, rather than a per-item basis. Thus, the interval for device 102 would be five regardless of whether the two read requests that were set to device 102 were directed to the same item, or to different items.

The interval of a device varies inversely with the percentage of read requests the read-request handler sends to the device. For example, if 50% of the read requests received by a read-request handler are sent to device 102, the interval for device 102 will be two. On the other hand, if only one out of every hundred read request is sent to device 102, then the interval for device 102 would be 100.

A device with a lower interval than another device is receiving read requests more frequently than the other device, and therefore can be presumed to be busier than the other device. Therefore, according to one embodiment, the read-request handler responds to each read request by (a) determining which devices have copies of the item to which the read request is directed (the "candidate set of devices"), and (b) sending the read request to the device, within the candidate set, that has the highest interval.

Smoothed Intervals

An interval provides a single data point for determining how busy a device is. However, single data points frequently do not accurately portray the actual condition of the system. For example, an otherwise underutilized device may be issued two read requests in rapid succession. The interval between those requests may be small, indicating that the device is very busy so subsequent read requests for items on the device should be directed to other devices with those items. Conversely, a heavily accessed device may experience a short respite that results in a long interval. Due to the long interval, the next read request that can be handled by the busy device will be directed to the busy device, even though other devices with the same items are generally less busy.

To obtain a more accurate measure of the general busyness of a device, smoothed (i.e. averaged) interval may be used. For example, a new smoothed interval for each device may be calculated, when the device is sent a read request, using the following formula: $NSI=(k*PSI)+((1-k)*CI)$, where NSI is the new smoothed interval, PSI is the previous smoothed interval, CI is the current interval, and k is a coefficient that determines the relative weight given to (a) the previous smoothed interval, and (b) the current interval.

In an embodiment that uses the smoothing formula specified above, the higher the value of k, the more weight is given to how busy a device has been in the past (as indicated by the PSI). Consequently, a high k value will cause a more gradual change in the allocation of read request assignments when a significant change occurs in system 100 (e.g. when a device fails). However, once a steady state is achieved after a significant change, the high value of k ensures that little fluctuation will occur in the allocation of read request assignments.

For example, assume that k is 0.9 and that the PSI for each of the devices in system 100 is 5 (indicating that the read request allocation is substantially balanced among the five devices). If device 102 then fails, the CI for devices 104 and 110 will begin to rise, because they will begin to receive read requests that would have been sent to device 102. Assuming that the new interval at which devices 104 and 110 begin to receive read requests is 3, rather than 5, their NSI after the first post-failure interval will be $(0.9*5)+(0.1*3)=4.8$. After the second post-failure interval, their NSI will be $(0.9*4.8)+(0.1*3)=4.62$. The slow rate at which NSI is converging on the CI of 3 means that many intervals will be required before the NSIs of devices 104 and 110 accurately reflect the post-failure level of busyness of devices 104 and 110.

On the other hand, a low k value will cause a faster change in the allocation of read request assignments after a significant change, but will result in more fluctuation during a steady state. For example, assume that k is 0.1 and that the pre-failure PSI for each of the devices in system 100 is 5. Assuming again that the post-failure interval at which devices 104 and 110 begin to receive read requests is 3, rather than 5, their NSI after the first post-failure interval will be $(0.1*5)+(0.9*3)=3.2$. After the second post-failure interval, their NSI will be $(0.1*3.2)+(0.9*3)=3.02$. The fast rate at which NSI is converging on the CI of 3 means that few intervals are required before the NSIs of devices 104 and 110 accurately reflect the post-failure level of busyness of devices 104 and 110.

The formula specified above for generating a smoothed interval for each device is merely one way of smoothing the interval values used by the read-request handler to determine where to direct read requests. However, the techniques described herein are not limited to any particular formula. For example, smoothed interval values may be obtained by averaging the most recent 10 intervals of each device. Smoothed interval values may also be obtained by taking a weighted average of the last 100 intervals of a device, where more recent intervals are given more weight than long-past intervals.

A read-request handler that assigns read requests to devices based on smoothed interval values operates similar to a read-request handler that assigns read requests based on intervals, as described above. Specifically, the read-request handler responds to each read request by (a) determining the candidate set of devices, and (b) sending the read request to the device, within the candidate set, that has the highest smoothed interval.

Estimating Busyness of Devices Using Response Time

As used herein, response time generally refers to how quickly a device handles a read request. In general, the busier a device is, the slower its response time will be. Therefore, a read-request handler can use the response time of a device as a measure of the busyness of the device, instead of or in addition to using intervals as a measure of busyness.

Just as a single interval may not accurately reflect the actual busyness of a device, the response time associated with a single read request may not accurately indicate the actual busyness of a device. Therefore, response time values may be smoothed in a manner similar to interval values.

A read-request handler that assigns read requests to devices based on smoothed response time values operates similar to a read-request handler that assigns read requests based on smoothed interval values, as described above. Specifically, the read-request handler responds to each read request by (a) determining the candidate set of devices, and (b) sending the read request to the device, within the candidate set, that has the fastest smoothed response time value.

A read-request handler that assigns read requests to devices based on both smoothed response time values and smoothed interval values would generate a busyness score for which both response time and interval are factors. Such a read-request handler would respond to each read request by (a) determining the candidate set of devices, and (b) sending the read request to the device, within the candidate set, that has the lowest busyness score.

Device Handicaps

If all of the storage devices in a storage system are identical, and all the items stored thereon are of identical importance, then it would be desirable to assign the same amount of read requests to each of the storage devices. Specifically, it would be desirable for all storage devices to have the same interval or response time. However, it is not always desirable to equalize the read requests between storage devices. For example, if one storage device is significantly smaller and/or slower than the others, it would be better to send fewer read requests to that device than to the others. As another example, a pair of storage devices may hold copies of an item that must be accessed more quickly than other items. To ensure fast retrieval of the important item, it may be desirable to keep that pair of storage devices less busy than other storage devices. These are merely examples of the many possible reasons one may have to distribute the read request load unevenly among the storage devices in a system.

According to one embodiment, uneven distribution during steady-state operation is achieved by determining a handicap value for each storage device. The handicap associated with a device may be specified by the manufacture of the device, specified by an administrator, or be derived automatically based on the characteristics of the device, or metrics obtained by monitoring the device during usage. The techniques described herein are not limited to any particular way of determining the handicaps for devices.

In one embodiment, before comparing the busyness measures associated of the candidate devices with each other, the read-request handler adjusts each device's busyness measure by the device's handicap to produce a handicap-adjusted busyness measure. The adjustment may be made by multiplying the non-handicapped busyness measure by a handicap weight, or by adding a handicap factor to the non-handicapped busyness measure. The read-request handler then compares the handicap-adjusted busyness measures to each other, and sends the read request to the device, among the candidate set of devices, that has the lowest handicap-adjusted busyness measure.

For example, assume that device 102 has a handicap of 1, while device 104 has a handicap of 1.2 (indicating that, ideally, device 104 should receive 20% more read requests than device 102). Assume also that, at the time the read-request handler receives a read request directed to item A, the smoothed interval of device 102 is 5, while the smoothed interval of device 104 is 4.7. In the absence of any handicap, the read-request handler would send the read request to device 102, because device 102 has the higher smoothed interval. However, applying the handicaps produces a handicap-adjusted smoothed interval of (5*1)=5 for device 102, and a handicap-adjusted busyness measure of (4.7*1.2)=5.64 for device 104. Based on the handicap-adjusted busyness measures, the read-request handler would send the read request that targets item A to device 104, rather than device 102.

Accounting for Size Differences in Read Requests

In many storage systems, read requests may be for variable amounts of data. For example, one read request may request only 8K (8 Kilobytes) of data, while another read request may request 2M (2 Megabytes) of data. In general, the larger the amount of data requested, the greater the amount of work required by the device that provides the data. Consequently, if all read requests are counted equal, intervals may not accurately reflect the actual busyness of devices.

For example, assume that each device in system 100 received one fifth of the read requests. If all read requests were counted the same, then all five of the devices would have an interval of five, indicating a perfectly equal workload across the five devices. However, the reality may be that all of the read requests sent to device 102 are for 2M of data, whereas the read requests sent to all other devices are only for 4K of data. Under these circumstances, device 102 would be significantly busier than the other devices, but that disparity in busyness would not be reflected in the intervals of the devices.

To account for the differences in work required by read requests for different amounts of data, when computing the interval of a device, larger read requests may be given more weight than smaller read requests. For example, a read request for amounts up to 8K may be considered 1, read requests from 8K to 1M may be considered 1.2, and requests over 1M may be considered 1.5.

In adjusting the interval value based on read request sizes, the adjustment to the interval of a device may be based on the size of the read requests to other devices, the size of the read requests to the device itself, or both. For example, in an embodiment that adjusts the interval of a device based on the size of read requests to other devices, the current interval (CI) of a device may be the sum of the weighted values of the read requests that occurred between the most recent consecutive read requests that were sent to that device.

For example, assume that after device 102 receives a first read request, four read requests are sent to other devices, and then device 102 receives a second read request. Assume further that the four intervening read request were for amounts of 4K, 4K, 4K, and 2K. Under these circumstances, the current interval for device 102 would be 1+1+1+1=4. On the other hand, if between the first and second read requests, other devices receive read requests for amounts of 2M, 800K, 4K, and 5M, the current interval for device 102 would be 1.5+1.2+1+1.5=5.2.

In an embodiment that adjusts the interval of a device based on the size of read requests to the device itself, intervals that end with a large read request may be adjusted down, while intervals that end with a small read request may be adjusted up. For example, assume that after device 102 receives a first read request, four read requests are sent to other devices, and then device 102 receives a second read request. Without any adjustment, the current interval for device 102 would be 5. However, if the second read request is for less than 4K, the interval may be increased be 0.2 to 5.2. On the other hand, if the second read request is for more than 1M, the interval may be decreased by 0.5 to 4.5.

These are merely examples of the various ways the current interval of a device may be increased or decreased to account for the sizes of read requests that the device receives and/or the sizes of read requests that other devices receive. The amount of the adjustments may be based on a formula, or simply obtained from a look-up table. The amount of the adjustments may also vary from device to device. For example, some devices may handle large read operations more easily than others, so the current interval of those devices would be decreased less when the device receives a large read request than would the current interval of the other device.

Reinitializing the Busyness Values in Response to a Change

After a significant change within a storage system, such as the failure of a device, it may take a significant amount of time before smoothed busyness measures accurately reflect the new reality in the system. For example, assume that all devices in system 100 initially have smoothed intervals of 5. At that point, if device 102 fails, the current interval of devices 104 and 110 may immediately drop to 3 (indicating that devices 102 and 104 are being overworked), but the smoothed interval of devices 104 and 110 would only gradually begin to drop from 5. As the smoothed interval of devices 104 and 110 gradually drops, the smoothed interval of devices 106 and 108 would gradually rise. Ideally, system 100 will eventually reach an equilibrium in which the smoothed intervals of each of the surviving devices 104, 106, 108 and 110 would be 4. However, during the time it takes for the smoothed intervals to achieve the equilibrium, devices 104 and 110 will be overloaded while devices 106 and 108 are underutilized.

According to an embodiment, the process of reaching a new equilibrium is accelerated by reinitializing the smoothed interval values in response to the occurrence of a significant change. For example, when it is detected that device 102 has failed, the read-request handler determines a seed interval value for each of devices 104-110. In one embodiment, the seed interval value for a device is the smoothed interval value the device is expected to have when the system 100 reaches equilibrium after the change. In the present example, the read-request handler would expect the smoothed intervals of devices 104-110 to converge to 4 after the failure of device 102. Rather than wait for the smoothed intervals to converge to 4, the read-request handler reinitializes the smoothed intervals of each of the devices to 4.

As another example, if device 102 comes back online, the read-request handler would again reinitialize the smoothed interval values of all devices 102-110 to five, even though at the time device 102 comes online, device 102 does not actually have a valid interval value, and the smoothed interval values of devices 104-110 would probably be lower than 5.

Similar seeding can be done when other types of busyness measures are used. For example, in a system that uses response time as a busyness measure, when a device fails, the smoothed response time values of all surviving devices may be reset to a seed value that is slower than their actual smoothed response time value (because the burden on the surviving devices is expected to increase). Conversely, when a new device comes online, the smoothed response time values of all devices (including the newly added device), may be reset to a seed value that reflects how the response time of the devices is expected to change.

Adjusting K in Response to a Change

As previously illustrated, a high value for k (e.g. 0.9) gives more weight to the past average busyness value, and causes the smoothed busyness value to change gradually. In contrast, a low value for k (e.g. 0.1) gives more weight to the most recent busyness measurement, and causes the smoothed busyness value to change rapidly. Therefore, according to one embodiment, instead of or in addition to seeding the smoothed busyness values after a change, the value of k used in the smoothing formula may be reduced after a change to give more weight to new busyness measures.

For example, in response to a significant change in system 100 (such as failure of a device, or addition of a device), k may be changed from 0.9 to 0.1. Because of this change, the smoothed busyness measures will quickly converge on what should approximate the new equilibrium of system 100. After a certain amount of time, or a certain number or read requests, the value of k can be changed back to 0.9, to avoid significant fluctuation while in a relatively steady-state situation.

In one embodiment, the value of k gradually returns to its steady-state value after a change. For example, in steady-state conditions, k may be 0.9. In response to a change, k may be changed to 0.1. After 100 read requests (or a certain period of time), k may be increased to 0.2. After another 100 read requests (or another period of time), k may be increased to 0.3. This process may continue until k has ultimately been increased back to its steady state value of 0.9.

Recovering after Busy Periods

A smoothed busyness measure only reflects reality up to the last data point that was used to generate the busyness measure. If the busyness measure of any device becomes stale due to absence of new data points for the device, the busyness measures cease to provide an accurate basis for selecting which candidate devices are to be sent new read requests.

For example, assume that item A receives a sustained burst of read requests that drive the smoothed intervals of devices 102 to 104 down to 2. Further assume that there is a long period after the sustained burst in which item A receives no read requests. Because devices 102 and 104 have such low smoothed intervals, all read requests for items B and E would be sent to devices 106 and 110, respectively. Because devices 102 and 104 are not receiving any new read requests, their smoothed intervals will not be updated with new data points. Without any new data points, the smoothed intervals will remain stuck at 2, indicating that devices 102 and 104 continue to be very busy even though devices 102 and 104 are now less busy than the other devices.

Similar problems may occur when other busyness measures are used. For example, in a system that uses response time for a busyness measure, a device may experience slow response times for a sustained period, driving the smooth response time value of the device high above other devices. Because the smoothed response time value is so high, read requests that could be handled by the device will be sent to other devices. Because the device is receiving no new read requests, the smoothed response time value would remain high.

Various techniques may be used to "unstick" the busyness measure of a device after a busy period. For example, in one embodiment, periodic adjustments are automatically made to the smoothed busyness measures of devices. Specifically, in a system that assigns read requests to devices based on smoothed intervals may increment the smoothed intervals of all devices by a certain amount every minute. Eventually, the smoothed intervals of devices that are not receiving read requests will rise high enough that they will start to receive read requests again.

Similarly, in a system that assigns read requests based on response time, large smooth response time values can be decremented periodically. Eventually, the large response time values will decrease to the point where the corresponding devices start to be assigned read requests again.

Another technique for preventing high busyness values from being stuck is to implement a policy in which each device that has a copy of an item receives at least a minimum percentage of the read requests for the item. For example, such a policy may require each of the devices in system 100 to receive a minimum of 5% of the read requests for the items that they store. In such an embodiment, device 102 would receive at least one out of every twenty read requests for item E, even if the smoothed interval for device 102 had been driven down to 2. Similarly, a device with a slow smoothed response time would still receive 5% of the read requests for the items it stores. These read requests add new data points that will eventually cause the smoothed busyness measures of no-longer-busy devices to indicate that the devices are no longer busy.

In yet another embodiment, at the end of a given period of time, "phantom read requests" can be applied to all devices that did not receive any actual read requests during that time period. Phantom read requests are not actual read requests, but cause the smoothed busyness measures to be recalculated as if the device had received a read request. For example, in a system that uses smooth intervals as the busyness measure, a particular device with a smoothed interval value of 2 may have received no read requests during a time period. If fifty read requests were sent to other devices during that time period, the smoothed interval of the particular device may be recalculated using 50 as the current interval value. For example, if k is 0.9 then the new smoothed interval of the device would be:

NSI=(0.9*2)+((0.1)*50)=(1.8+5)=6.8.

In the context of response time measures, the phantom read request may be accounted for by adjusting the smoothed response time of a device as if the device had responded quickly to a read request. For example, assume that the average expected response time of a device is 100, and the smoothed response time of the device is 200. Because of the high smoothed response time value, the device may receive no read requests during a particular period. At the end of the period, the read-request handler may adjust the smoothed response time value of the device as it the device had exhibited a response time of 50 when responding to the phantom read request. Using a smoothing formula similar to the one described above, with a k of 0.9, the new smoothed response time would be: NSL=(0.9*200)+(0.1*50)=(180+5)=185. As the device receives more phantom read requests, the smoothed response time of the device will converge on 50 (the presumed response time of the phantom read requests). Eventually, the smoothed response time of the device will be sufficiently low that the device will start being assigned actual read requests.

Client-Side Read-Request Handlers

As mentioned above, a read-request handler uses per-device busyness measures to determine which device, among the candidate set of devices for a particular read request, should receive the read request. In one embodiment, the request handler resides in the storage system, and therefore calculates the busyness measure of a device based on all of the read requests that are sent to the storage system to which the device belongs.

In an alternate embodiment, each client that interacts with system 100 has its own read-request handler. The busyness factors calculated by the read-request handlers of each client are based on the read requests that the client sends to the system 100, without taking into account the read requests that other clients are sending to system 100. However, because each client is spreading its read requests evenly among the devices in system 100, all read requests received by system 100 tend to be spread evenly among the devices in system 100. Thus, client-based optimization of read request assignments tends to produce a system-wide optimization of read request assignments.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
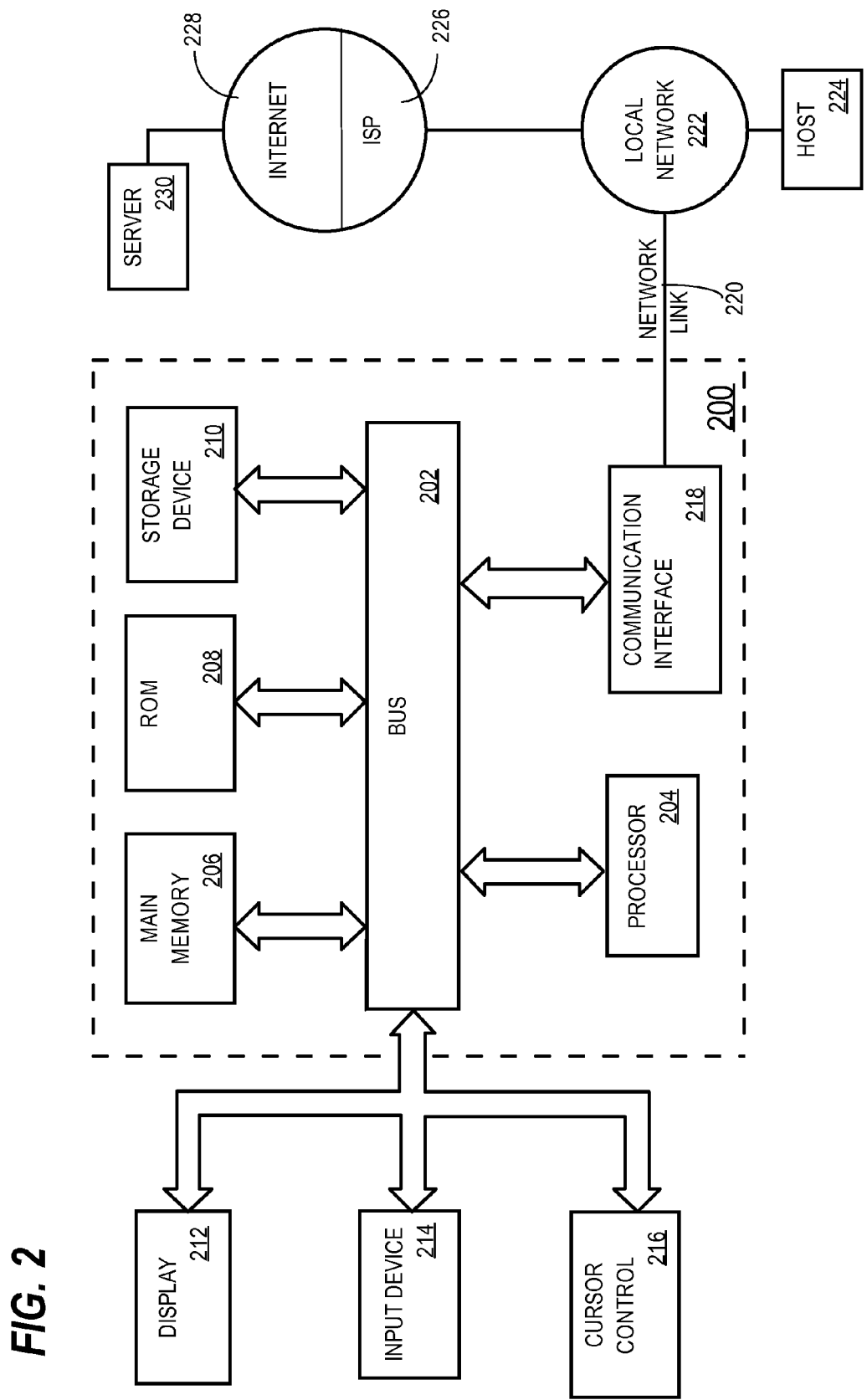
FIG. 2 is a block diagram of a computer system upon which embodiments of the invention may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method comprising:
    for each device of a plurality of devices in a storage system, calculating a respective busyness value;
    receiving a read request that targets a particular item for which copies of the particular item are stored on at least two devices of the plurality of devices but not all of the plurality of devices;
    in response to receiving the read request, performing the steps of:
        identifying the at least two devices that store copies of the particular item;
        determining which particular device, of the at least two devices, has a respective busyness value that indicates that the particular device is less busy than the other devices of the at least two devices; and
        sending the read request to the particular device, of the at least two devices, that has a respective busyness value that indicates that the particular device is less busy than the other devices of the at least two devices;
    wherein:
        the method is performed by one or more computing devices;
        the respective busyness value of said each device is based, at least in part, on an interval associated with said each device; and
        the interval associated with said each device is based on an amount of load experienced by other devices of the plurality of devices between two consecutive read requests that are sent to each said device.

2. The method of claim 1 wherein
the interval associated with said each device is based on how many read requests are sent to other devices of the plurality of devices between two consecutive read requests that are sent to said each device.

3. The method of claim 2 wherein the interval associated with said each device is based, at least in part, on at least one of: size of read requests sent to other devices of the plurality of devices, or size of read requests sent to said each device.

4. The method of claim 1 wherein calculating the respective busyness value for said each device includes calculating the respective busyness value based, at least in part, on a response time experienced by said each device when processing a read request.

5. The method of claim 1 wherein the respective busyness value calculated for said each device is a smoothed busyness value that is based on a current busyness value for said each device and one or more past busyness values for said each device.

6. The method of claim 5 wherein calculating smoothed busyness value for said each device includes giving a first weight to the one or more past busyness values when a system that includes the plurality of devices is in a steady state, and giving a second weight to the one or more past busyness values in response to a significant change in the system, wherein the first weight is greater than the second weight.

7. The method of claim 5 further comprising reinitializing the respective busyness value of at least one of the plurality of devices to a seed value in response to a significant change in a system that includes the plurality of devices.

8. The method of claim 1 further comprising adjusting the respective busyness value of at least one device of the plurality of devices from a first value to a second value after a period in which the at least one device has not received any read requests, wherein the second value indicates that the at least one device is less busy than is indicated by the first value.

9. The method of claim 1 further comprising adjusting the respective busyness value of said each device by treating said each device as if said each device had received a phantom read request.

10. The method of claim 1 wherein the respective busyness value of at least one device of the plurality of devices is a handicapped busyness value generated by adjusting an un-handicapped busyness value of the at least one device based on a handicap associated with the at least one device.

11. A non-transitory computer-readable storage that stores instructions which, when executed by one or more processors, cause:
for each device of a plurality of devices in a storage system, calculating a respective busyness value;
receiving a read request that targets a particular item for which copies of the particular item are stored on at least two devices of the plurality of devices but not all of the plurality of devices;
in response to receiving the read request, performing:
identifying the at least two devices that store copies of the particular item;
determining which particular device, of the at least two devices, has a respective busyness value that indicates that the particular device is less busy than the other devices of the at least two devices; and
sending the read request to the particular device, of the at least two devices, that has a respective busyness value that indicates that the particular device is less busy than the other devices of the at least two devices;

wherein:
the non-transitory computer-readable storage is performed by one or more computing devices;
the respective busyness value of said each device is based, at least in part, on an interval associated with said each device; and
the interval associated with said each device is based on an amount of load experienced by other devices of the plurality of devices between two consecutive read requests that are sent to said each device.

12. The non-transitory computer-readable storage of claim 11 wherein
the interval associated with said each device is based on how many read requests are sent to other devices of the plurality of devices between two consecutive read requests that are sent to said each device.

13. The non-transitory computer-readable storage of claim 12 wherein the interval associated with said each device is based, at least in part, on at least one of: size of read requests sent to other devices of the plurality of devices, or size of read requests sent to said each device.

14. The non-transitory computer-readable storage of claim 11 wherein calculating the respective busyness value for said each device includes calculating the respective busyness value based, at least in part, on a response time experienced by said each device when processing a read request.

15. The non-transitory computer-readable storage of claim 11 wherein the respective busyness value calculated for said each device is a smoothed busyness value that is based on a current busyness value for said each device and one or more past busyness values for said each device.

16. The non-transitory computer-readable storage of claim 15 wherein calculating a smoothed busyness value for said each device includes giving a first weight to the one or more past busyness values when a system that includes the plurality of devices is in a steady state condition, and giving a second weight to the one or more past busyness values in response to a significant change in the system, wherein the first weight is greater than the second weight.

17. The non-transitory computer-readable storage of claim 15 wherein the instructions, when executed by said one or more processors, further cause reinitializing the respective busyness value of at least one of the plurality of devices to a seed value in response to a significant change in a system that includes the plurality of devices.

18. The non-transitory computer-readable storage of claim 11 wherein the instructions, when executed by said one or more processors, further cause adjusting the respective busyness value of at least one device of the plurality of devices from a first value to a second value after a period in which the at least one device has not received any read requests, wherein the second value indicates that the at least one device is less busy than is indicated by the first value.

19. The non-transitory computer-readable storage of claim 11 wherein the instructions, when executed by said one or more processors, further cause adjusting the respective busyness value of said each device by treating said each device as if said each device had received a phantom read request.

20. The non-transitory computer-readable storage of claim 11 wherein the respective busyness value of at least one device of the plurality of devices is a handicapped busyness value generated by adjusting an un-handicapped busyness value of the at least one device based on a handicap associated with the at least one device.

* * * * *